Patented Feb. 28, 1950

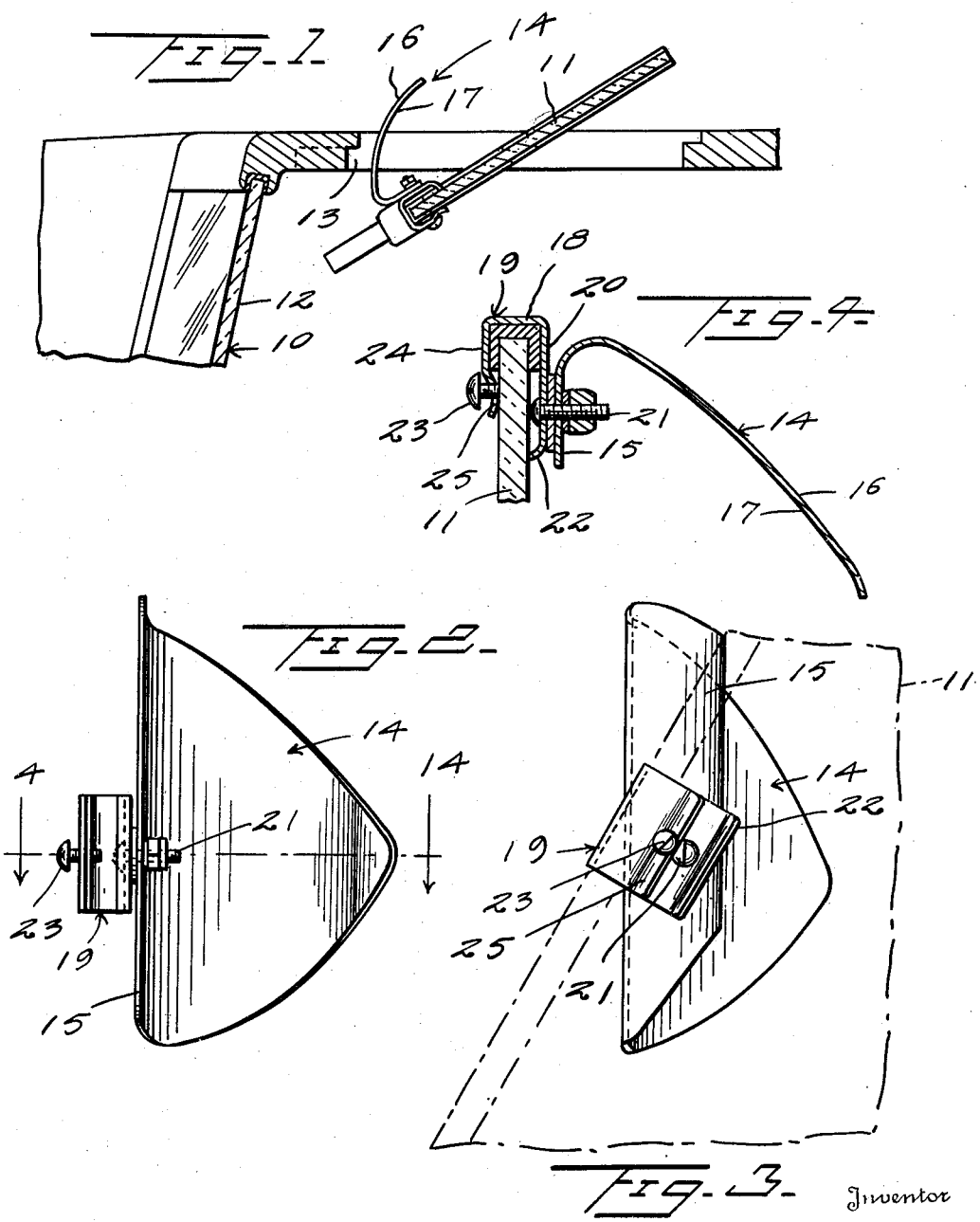

2,499,127

UNITED STATES PATENT OFFICE 2,499,127

BREEZE DIRECTOR

Noah B. Beard, Oklahoma City, Okla.

Application April 21, 1949, Serial No. 88,737

1 Claim. (Cl. 296—44)

This invention relates to a ventilator attachment for motor vehicles.

In motor vehicles it is now conventional to provide in the doors a ventilator window of generally triangular configuration which operates independently of the main window. When this ventilator window is opened to a predetermined degree, a draft of air is created across the vehicle and along the inner side of the vehicle. It is an object of this invention to provide an attachment for the ventilator window which can be easily and quickly adjusted so that the incoming air may be directed downwardly or at any selected angle.

It is especially desirable, in connection with the ventilator windows provided in the front doors of the vehicle, that devices such as those of my invention be used. This use permits, for example, having the ventilators slightly open during a rain and when the ventilators as well as the door windows would be normally closed. With the use of my invention, no rain will come in and yet air is freely admitted, thus preventing fogging of the windows and windshield as well as giving ventilation. Furthermore, air thus entering can be controlled over a full 180 degrees as to both volume and direction. With my devices in use, the driver can have a desired flow of air on his side without disturbing the passengers on the rest of the front seat. Also, the said passengers can regulate the air on their side to suit themselves, without disturbing the driver. Ordinarily, without my devices being part of the equipment, the driver has to depend on adjustment of the draft ventilator on the opposite side of the car and vice versa as to the other passengers. My device makes it fully convenient for handy regulation of the breeze either across the feet or lower part of the body only or if desired, regulation over a full 180 degrees. Various combinations of breeze and ventilation effects can be instantly had with my device used in conjunction with suitable regulation of the ventilator windows.

Attachment of my device is so constructed as to prevent theft thereof simply by the ordinary locking of the door and ventilator windows.

Another object of this invention is to provide an attachment of this kind which is of simple construction so that it can be manufactured at small cost and can be put onto the ventilator window without altering the sash, and without affecting the opening and closing of the sash.

With the above and other objects in view, my invention consists in the arrangement, combination and details of construction disclosed in the drawings and specification, and then more particularly pointed out in the appended claim.

In the drawing,

Figure 1 is a fragmentary horizontal section through a portion of a motor vehicle having a ventilating attachment constructed according to an embodiment of this invention mounted on the ventilating panel of the vehicle, Figure 2 is a detail end elevation of the attachment, Figure 3 is a detail side elevation of the attachment, Figure 4 is a sectional view taken on the line 4—4 of Figure 2.

Referring to the drawing, the numeral 10 designates generally a vehicle of conventional construction which has mounted on one side thereof adjacent the forward portion of the body a pivoted ventilating panel 11. The panel 11 is mounted on vertical pivots and is usually of generally triangular configuration, with the forward edge thereof inclined downwardly and forwardly to conform to the configuration of the body and windshield. When the panel 11 is opened the forward edge thereof swings inwardly and a draft of air is created across the inner side of the windshield 12.

In order to provide a means whereby the draft of air passing through the window opening 13 may be directed downwardly or in any other desired direction, I have provided a draft regulator member which comprises a plate 14 of generally triangular configuration, which is longitudinally curved and which has an acutely disposed flange 15 integral with the base thereof. The base of the plate 14 is forwardly disposed when in applied position. The convex side 16 will be outermost and in a forward position whereas the concave side 17 thereof will be innermost. The attachment is adapted to be removably secured to the channel frame 18 for the panel 11 by means of a resilient U-shaped clamp 19. The clamp 19 straddles the channel member 18 and is formed with a relatively long outer leg 20 through which a clamping bolt 21 engages. The bolt 21 also engages through the flange 15 so that the plate 14 may be angularly adjusted with respect to the vertical and with respect to the clamp 19. The clamp 19 includes an inwardly bent edge portion 22 which is carried by the long leg 20 and is adapted to engage against the glass panel 11 and also includes an offset rib 25 carried by the short leg 24 of the clamp. A screw 23 is threaded through the short leg 24 of the clamping member 19 engaging through the rib 25 and is adapted to bear against the adjacent side of the panel 11.

In the use of this invention the clamp 19 is snapped over the channel member 18 of the panel 11 with the plate 14 disposed on the outer side of panel 11 and the rib 25 engaging the inner edge of the channel member 18. The screw 23 is threaded inwardly to engage the panel 11 and provide a locking edge for preventing removal of the clamp. It will be understood that in the conventional mounting for the panel 11 there is provided a rubber stop in the door frame about the edge of the opening 13 and against which the panel 11 with the channel member 18 is adapted to engage. When the panel 11 is turned to an open position with the forward edge thereof projecting inwardly of the body of the vehicle, the attachment may be adjusted by turning the plate 14 about the axis of the bolt 21. The plate 14, with the flange 15, will be disposed in substantially the position shown in Figure 1, and also in Figure 2. The draft of air coming into the vehicle on the rear side of the windshield 12, will by means of this attachment be directed downwardly with the attachment adjusted as herein shown. It will, of course, be understood that the direction of movement of the incoming air striking the ventilating attachment may be varied by simply turning the air directing member, comprising the plate 14 and the flange 15, about the axis of the bolt 21. This device can be easily and quickly mounted on a conventional ventilating panel and will not interfere in any manner with the normal use of the ventilating panel. When the panel 11 is closed the attachment cannot be bodily removed by an unauthorized person as the clamp 19 will be pinched in the frame for the panel 11.

I do not mean to confine my self to the exact details of construction herein disclosed, but claim all variations falling within the purview of the appended claim.

What I claim is:

A ventilation control attachment for a motor vehicle having a window opening provided with a ventilator panel adjustable about a vertical axis and mounted in a U-shaped frame, said attachment comprising a longitudinally curved plate disposed with the convex side thereof outermost, a returned flange carried by the inner edge of said plate disposed on the concave side of the latter, a resilient U-shaped clamp engageable over said frame, inwardly offset means carried by said clamp adapted to engage the opposite faces of said panel, means carried by one leg of said clamp cooperating with said offset means and one of said faces to prevent unauthorized removal of said clamp, and means engaging the other leg of said clamp and said flange for securing said flange to said clamp whereby said plate and flange may be angularly adjusted relative to said ventilator panel to provide for angularly directing the incoming air to selected portions of the vehicle.

NOAH B. BEARD.

REFERENCES CITED

The following references are of record in the file of this patent:

UNITED STATES PATENTS

| Number | Name | Date |
|---|---|---|
| 2,147,855 | Normandin | Feb. 21, 1939 |
| 2,224,433 | Holden | Dec. 10, 1940 |
| 2,478,161 | Russell | Aug. 2, 1949 |